United States Patent Office 3,324,161
Patented June 6, 1967

3,324,161
PROCESS FOR THE PRODUCTION OF METHYL-(HYDROXYMETHYL)-SILOXANES
Walter Simmler, Cologne-Mulheim, Germany, assignor to Farbenfabriken Bayer Aktiengesellschaft, Leverkusen, Germany, a corporation of Germany
No Drawing. Filed Jan. 24, 1963, Ser. No. 253,741
Claims priority, application Germany, Feb. 3, 1962, F 35,920
9 Claims. (Cl. 260—448.2)

The present invention relates to the production of organosiloxanes of the general formula $R_nSiO_{4-n/2}$, in the molecule of which at least one R is the hydroxymethyl radical, all other R are methyl, and $n$ has a value between 1 and 3.

Siloxanes of this type, especially those which are substituted twice or several times by $HOCH_2$, are known to be valuable intermediate products on account of their alcoholic character, inter alia, for example, for the production of foam-preventing agents and of resins of the alkyd resin or polyurethane type. They can be obtained in known manner by first reacting a chloromethyl-substituted siloxane with an alkali metal, alkaline earth metal or silver carboxylate to give a carboxymethyl-substituted siloxane and producing from the latter in a second step, by reaction with a lower alcohol, the hydroxy-methyl-substituted siloxane and, as a by-product, the carboxylic acid ester of the said alcohol. This process is not only cumbersome, but increasingly with the length of the siloxane chains also splittings of the siloxane bonds occur.

It is also known that the reaction of chloromethyl-silicon compounds with alkali metal hydroxide yields, instead of the desired hydroxymethyl derivatives and alkali metal chloride, an alkali metal silanolate and methyl chloride with splitting of the Si—C bond. In contrast thereto, the invention is based on the surprising observation that bromomethyl silicon compounds show a substantially different behaviour so that the Si—C splitting can be obviated under suitable reaction conditions.

The object of the invention is therefore to provide an improved process for the production of methyl-(hydroxymethyl)-siloxanes. In accordance with the invention methyl-(hydroxymethyl)-siloxanes are obtained by reacting a methyl-(bromomethyl)-siloxane with an alkali metal hydroxide in the presence of methanol or ethanol at a temperature below 80° C.

In many cases the reaction proceeds already at room temperature within a few days. The low temperature at which undesirable splitting of the Si—O bond or the Si—C bond does not yet occur but, in fact, splitting off of the C—Br bond takes place, is important for the desired course of the reaction; equally important is the selection of the solvent, since it has been found that, for example, by the use of tetrahydrofuran as solvent the bromine is likewise dissociated as bromide ion by potassium hydroxide which is suspended or dissolved in water, but that at the same time the Si—C bond is split off with the formation of methanol and methoxysilicon compounds which may undergo further conversions through hydrolysis and condensation.

The following examples are given for the purpose of illustrating the invention.

Example 1

640 g. of 1,1,3,3-tetramethyl-1,3-di-(bromomethyl)-disiloxane (2 mol) are added to a solution of 129 g. of potassium hydroxide (87% KOH, 2 mol) in 800 cc. of methanol, and the mixture is allowed to stand at about 20° C. for 7 days. Starting with a cloudiness which sets in already after a few minutes, a white precipitate is gradually formed which, after filtering off, washing with methanol and drying in a vacuum at 45° C., yields, by argentometric bromide determination, 67.0% of Br (calculated for KBr: 67.2% of Br) and whose total amount of 104.5 g. contains 88% of the potassium amount used as KOH.

The methanol is evaporated off from the filtrate, and the residue is distilled at 0.5 mm. Hg. As a fraction distilling between 88 and 92° C. there are thus obtained 322 g. of a water-clear liquid which boils at 70° C. and 0.4 mm. Hg and can be identified as 1,1,3,3-tetramethyl-1-bromomethyl-3-hydroxy-methyl-disiloxane.

Found in elementary analysis: 30.8% Br; 6.4% OH.
Calculated: 31.1% Br; 6.6% OH.

Proportion of protons determined by magnetic nuclear resonance:

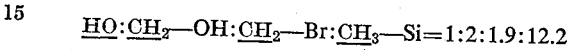

Calculated: 1:2:2:12.

Example 2

247 g. of the same product as in Example 1 are obtained by using, instead of potassium hydroxide, 88 g. of sodium hydroxide (91% NaOH, 2 mol) and proceeding otherwise in the manner there described.

Example 3

500 g. of a polysiloxane of the formula

with a mean value of $x=8.2$ are stirred with a solution of 76.8 g. of potassium hydroxide (87% KOH) in 800 cc. of methanol, and the dispersion thus formed and tending to settle is further stirred at room temperature for 5 days. During this time, 97.6 g. of potassium bromide precipitate containing 65% of the potassium amount used as KOH; after a further 3 days, the reaction is almost completed. The material is then filtered, the methanol is removed by blowing nitrogen through the two-phase filtrate at 30° C. and 5 mm. Hg, and then heating the homogeneous residue at 30° C. and 1 mm. Hg in a thin-layer evaporator. A thinly liquid oil remains behind with a OH content of 4.1 percent by weight. Thus, in the polysiloxane used, the Br—$CH_2$—Si groups have been replaced by

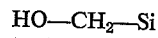

groups while the chain length is practically unchanged.

Example 4

500 g. of a polysiloxane of the formula

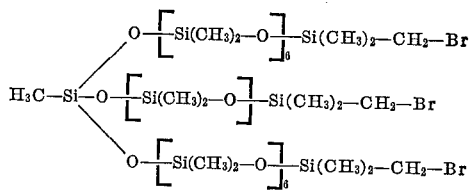

are added to a solution of 51.5 g. of potassium hydroxide (87% KOH) in 800 cc. of ethanol, the mixture is stirred at room temperature for 4 days, filtered and the process is continued as described in Example 3. A methyl-(hydroxymethyl)-polysiloxane with a OH content of 3.0 percent by weight is thus obtained.

Example 5

An identical methyl-(hydroxymethyl)-polysiloxane with an OH content of 2.9 percent by weight is obtained in an analogous manner within 3 days by stirring the starting mixture of Example 4 at 30° C.

I claim:
1. Process for the production of methyl-(hydroxymethyl)-siloxane, which comprises reacting a mixture consisting of a methyl-(bromomethyl)-siloxane and a solution of an equimolar proportion calculated on the number of bromomethyl groups, of an alkali metal hydroxide in an alcohol selected from the group consisting of methanol and ethanol, at a temperature of from room temperature to 80° C. and recovering the methyl-(hydroxymethyl)-siloxane formed thereby from the resulting reaction mixture.

2. Process for the production of methyl-(hydroxymethyl)-siloxane, which comprises reacting a mixture consisting of a methyl-(bromomethyl)-siloxane and a solution of equimolar proportion calculated on the number of bromomethyl groups present, of an alkali metal hydroxide in an alcohol selected from the group consisting of methanol and ethanol, at a temperature in the range of from room temperature to 80° C., and recovering the methyl-(hydroxymethyl)-siloxane formed thereby from the resulting reaction mixture.

3. Process according to claim 1 wherein said alcohol is ethanol.

4. Process according to claim 1 wherein said alcohol is methanol.

5. Process for the production of 1,1,3,3-tetramethyl-1-bromomethyl-3-hydroxymethyl-disiloxane, which comprises reacting a mixture consisting of 1,1,3,3-tetramethyl-1,3-di-(bromomethyl)-disiloxane and a solution of an equimolar proportion calculated on the number of the bromomethyl groups to be reacted of potassium hydroxide in methanol, at a temperature of about 20° C., and recovering the 1,1,3,3-tetramethyl-1-bromomethyl-3-hydroxymethyl-disiloxane.

6. Process for the production of 1,1,3,3-tetramethyl-1-bromomethyl-3-hydroxymethyl-disiloxane, which comprises reacting a mixture consisting of 1,1,3,3-tetramethyl-1,3-di-(bromomethyl)-disiloxane and a solution of an equimolar proportion calculated on the number of the bromomethyl groups to be reacted of sodium hydroxide in methanol, at a temperature of about 20° C., and recovering the 1,1,3,3-tetramethyl-1-bromomethyl-3-hydroxymethyl-disiloxane.

7. Process for the production of a methyl-(hydroxymethyl)-siloxane, which comrpises reacting a mixture consisting of

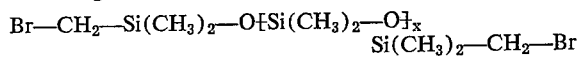
Br—CH$_2$—Si(CH$_3$)$_2$—O$\{$Si(CH$_3$)$_2$—O$\}_x$
Si(CH$_3$)$_2$—CH$_2$—Br wherein $x$ has a mean value of 8.2 and a solution of an equimolar proportion calculated on the number of bromomethyl groups present of potassium hydroxide in methanol at room temperature, and recovering the methyl-(hydroxymethyl)-siloxane formed thereby from the resulting reaction mixture.

8. Process for the production of a methyl-(hydroxymethyl)-siloxane, which comprises reacting a mixture consisting of

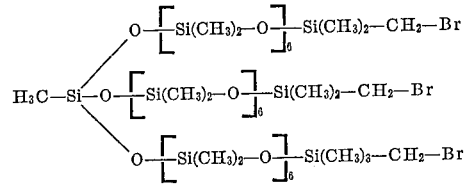

and a solution of an equimolar proportion calculated on the number of bromomethyl groups present of potassium hydroxide in ethanol at room temperature, and recovering the methyl-(hydroxymethyl)-siloxane formed thereby from the resulting reaction mixture.

9. Process for the production of a methyl-(hydroxymethyl)-siloxane, which comprises reacting a mixture consisting of

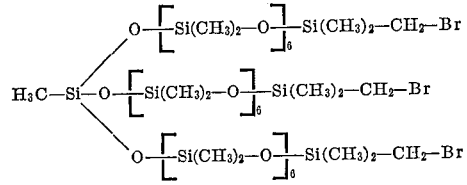

and a solution of an equimolar proportion calculed on the number of bromomethyl groups present of potassium hydroxide in ethanol at 30° C., and recovering the methyl-(hydroxymethyl)-siloxane formed thereby from the resulting reaction mixture.

References Cited
UNITED STATES PATENTS

| | | | |
|---|---|---|---|
| 1,566,818 | 12/1925 | Carter et al. | 260—640 |
| 2,527,591 | 10/1950 | Speier | 260—448.2 |

OTHER REFERENCES

Larsson: 51 Chem. Abstracts 16, 282 (1957).

TOBIAS E. LEVOW, *Primary Examiner.*

SAMUEL H. BLECH, HELEN M. McCARTHY,
*Examiners.*

P. F. SHAVER, *Assistant Examiner.*

UNITED STATES PATENT OFFICE
CERTIFICATE OF CORRECTION

Patent No. 3,324,161                                           June 6, 1967

Walter Simmler

It is hereby certified that error appears in the above numbered patent requiring correction and that the said Letters Patent should read as corrected below.

Column 2, line 55, for that portion of the formula reading $+Si(CH_3)_2-O+$ read $+Si(CH_3)_2-O+_6$ column 4, lines 9 to 15, the lower portion of the formula reading $Si(CH_3)_3$ read $Si(CH_3)_2$ same column 4, line 33, for "calculed" read -- calculated --.

Signed and sealed this 9th day of January 1968.

(SEAL)
Attest:

Edward M. Fletcher, Jr.                                         EDWARD J. BRENNER
Attesting Officer                                                    Commissioner of Patents